(12) United States Patent
Rao

(10) Patent No.: US 11,745,893 B2
(45) Date of Patent: Sep. 5, 2023

(54) MAGNETIC REFUELING ASSEMBLY

(71) Applicant: Sridhar Vakkalanka Rao, Broadlands, VA (US)

(72) Inventor: Sridhar Vakkalanka Rao, Broadlands, VA (US)

(73) Assignee: NORTHROP GRUMMAN SYSTEMS CORPORATION, Falls Church, VA (US)

(*) Notice: Subject to any disclaimer, the term of this patent is extended or adjusted under 35 U.S.C. 154(b) by 306 days.

(21) Appl. No.: 17/243,745

(22) Filed: Apr. 29, 2021

(65) Prior Publication Data
US 2022/0348345 A1 Nov. 3, 2022

(51) Int. Cl.
*B64D 39/06* (2006.01)

(52) U.S. Cl.
CPC ................... *B64D 39/06* (2013.01)

(58) Field of Classification Search
CPC ..................................................... B64D 39/06
See application file for complete search history.

(56) References Cited

U.S. PATENT DOCUMENTS

| | | |
|---|---|---|
| 2,676,114 A | 4/1954 | Barkley |
| 2,834,723 A | 5/1958 | Robinson |
| 3,201,236 A | 8/1965 | Hill |
| 3,627,569 A | 12/1971 | Beecham |
| 4,000,045 A | 12/1976 | Rotzow |
| 4,469,719 A | 9/1984 | Martin |
| 4,512,854 A | 4/1985 | Grah |
| 5,175,023 A | 12/1992 | Iwase |
| 5,326,052 A * | 7/1994 | Krispin .................. B64D 39/06 244/135 A |
| 6,508,980 B1 | 1/2003 | Sachs et al. |
| 6,966,525 B1 * | 11/2005 | Schroeder .............. B64D 39/00 244/135 A |
| 8,148,830 B2 | 4/2012 | Bedinger et al. |
| 8,163,337 B2 | 4/2012 | Guerin et al. |
| 9,840,336 B2 * | 12/2017 | Barsheshet ............ B64D 39/04 |
| 2002/0059903 A1 | 5/2002 | Hasegawa et al. |
| 2003/0135981 A1 | 7/2003 | Galyean |
| 2004/0012401 A1 | 1/2004 | King et al. |
| 2004/0018107 A1 | 1/2004 | Khoshnevis |
| 2004/0231999 A1 | 11/2004 | Morrissey |
| 2006/0145023 A1 * | 7/2006 | Babb ....................... B64G 1/64 244/172.4 |
| 2010/0038118 A1 | 2/2010 | Fan |
| 2012/0153285 A1 | 6/2012 | James et al. |
| 2016/0174364 A1 | 6/2016 | Harkness, Jr. et al. |
| 2017/0194171 A1 | 7/2017 | Peterson et al. |

* cited by examiner

*Primary Examiner* — Justin M Benedik
(74) *Attorney, Agent, or Firm* — Tarolli, Sundheim, Covell & Tummino LLP

(57) ABSTRACT

An in-flight refueling assembly for an aircraft to be refueled by a fuel dispensing aircraft includes a refueling probe extending from the aircraft and having an electromagnet with an energized condition and a non-energized condition. A refueling probe receptacle is connected to the fuel dispensing aircraft. A superconductor is connected to the receptacle such that the refueling probe becomes aligned with the receptacle when the electromagnet is placed in the energized condition.

20 Claims, 6 Drawing Sheets

MAGNETIC REFUELING ASSEMBLY

TECHNICAL FIELD

The present invention relates to aircraft and, in particular, relates to a magnetic refueling probe assembly for an aircraft.

BACKGROUND OF THE INVENTION

The in-flight refueling of aircraft is a very important capability in that it extends the usable range and endurance of the aircraft. Typical refueling devices include a fuel tube extending from the refueling aircraft that terminates in a receptacle for receiving a refueling probe, which is connected to the aircraft that sources fuel. The nozzle at the end of the refueling probe is a Military Standard part, for example, MS 24356(ASG) Nozzle-Type PA-2 Flight Pressure Refueling. The receptacle on the refueling aircraft is also a Military Standard part, for example, MS 24354 (ASG) Drogue Core, Nozzle And Refueling Coupling—Type MA-2 Flight-Pressure-Refueling System-Assembly Of.

SUMMARY OF THE INVENTION

In accordance with an example of the present invention, in-flight refueling assembly for an aircraft to be refueled by a fuel dispensing aircraft includes a refueling probe extending from the aircraft and having an electromagnet with an energized condition and a non-energized condition. A refueling probe receptacle is connected to the fuel dispensing aircraft. A superconductor is connected to the receptacle such that the refueling probe becomes aligned with the receptacle when the electromagnet is placed in the energized condition.

In another example, a method of fluidly connecting an aircraft with a fuel dispensing aircraft includes providing an electromagnet on a refueling probe of the aircraft. A superconductor is provided on a refueling probe receptacle of the fuel dispensing aircraft. The electromagnet is placed in an energized condition to automatically align the electromagnet with the superconductor. The probe is fluidly connected to the receptacle.

Other objects and advantages and a fuller understanding of the invention will be had from the following detailed description of the preferred embodiments and the accompanying drawings.

DETAILED DESCRIPTION OF THE INVENTION

Figure 1:
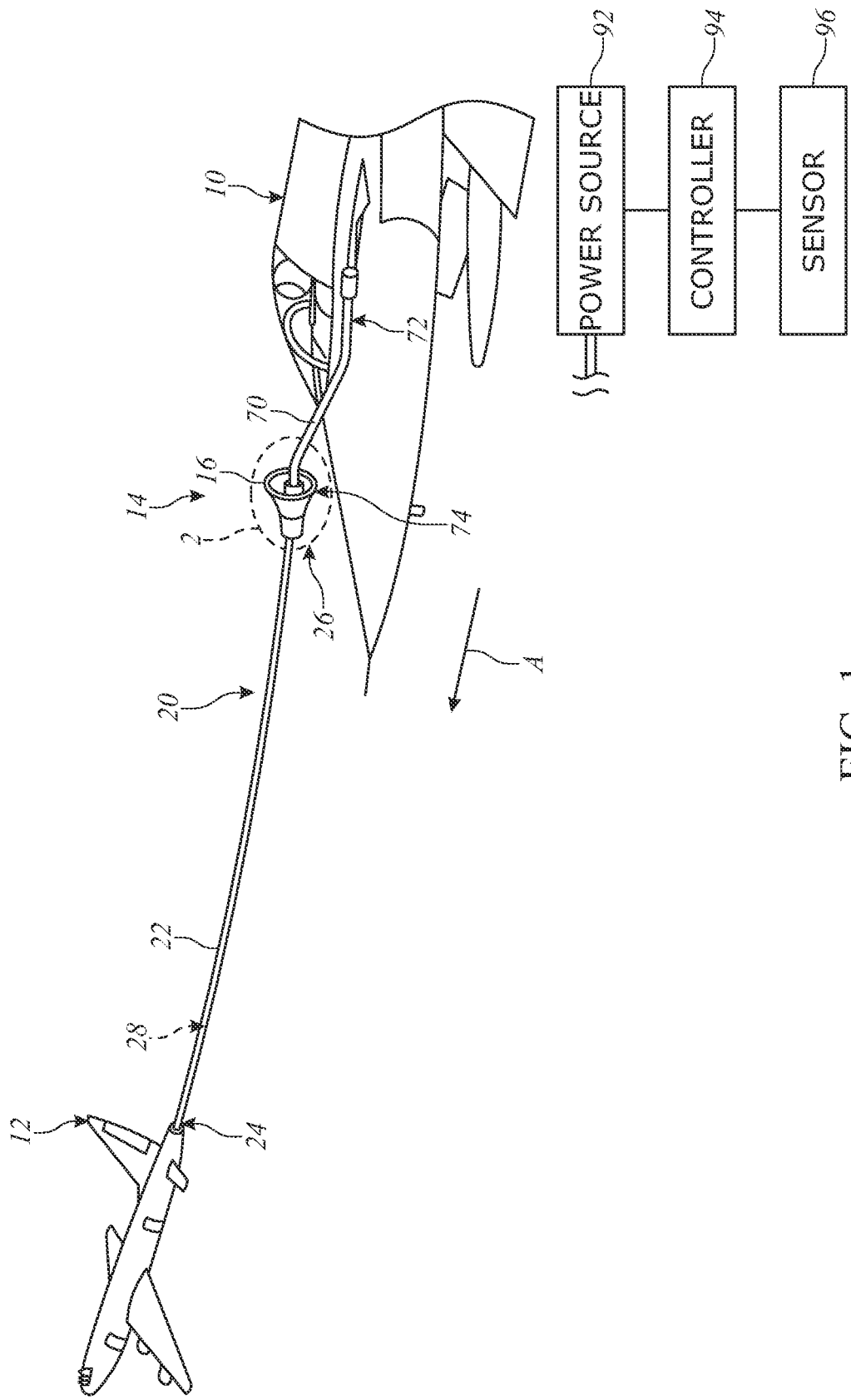
FIG. 1 is a schematic illustration of an aircraft being refueled by a tanker aircraft with an example refueling device in accordance with the present invention.
Figure 2:
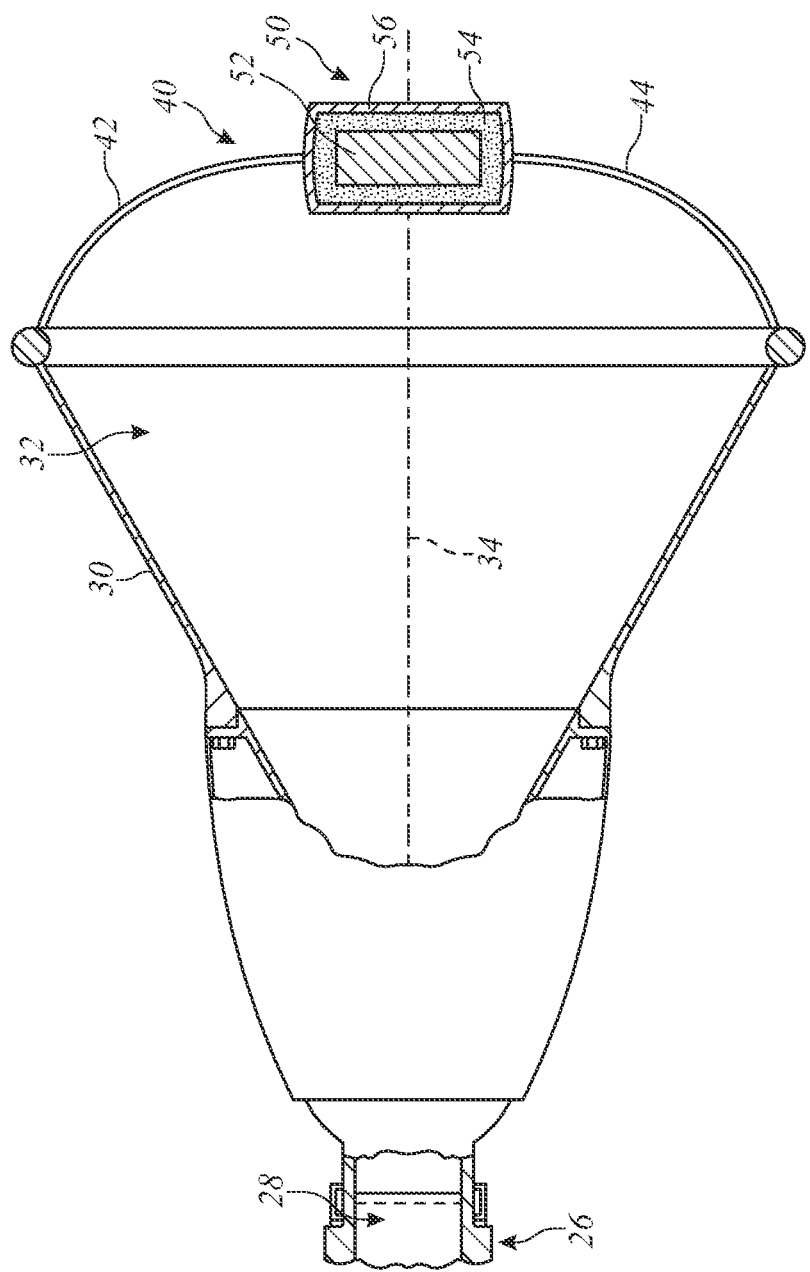
FIG. 2 is an enlarged, partial cross-sectional view of the refueling device of FIG. 1.

The present invention relates to aircraft and, in particular, relates to a magnetic refueling probe assembly for an aircraft. FIGS. 1 and 2 illustrate an aircraft 10 being refueled by a tanker or refueling aircraft 12 with an example refueling assembly 14 in accordance with an embodiment of the present invention. It will be appreciated that the refueling assembly 14 is illustrated as being implemented in military aircraft but can alternatively be used in commercial aviation applications, space flight applications, and shipping applications (such as cargo ships).

The tanker 12 includes a refueling device 20 having a tether 22 with a first end 24 connected to the tanker and a second end 26 connected to a refueling probe receptacle, e.g., a drogue 16. The tether 22 is a flexible tube and includes a passage 28 extending the entire length thereof in fluid communication with fuel (not shown) provided in the tanker 12.

In one example, the drogue 30 is conical and includes a receiving space 32 in fluid communication with the passage 28 in the tether 22. The drogue 30 extends generally along a centerline 34 away from the tether 22. The centerline 34 is also generally coextensive/aligned with the passage 28.

A coupling assembly 50 is connected to the drogue 30. The coupling assembly 50 can be located outside of the receiving space 32 (as shown) or partially/fully within the receiving space (not shown). Regardless, the coupling assembly 50 is generally aligned with the receiving space 32 of the drogue 30 and tightly/snugly connected to the drogue. In other words, the coupling assembly 50 is prevented from significantly moving relative to the drogue 30.

The coupling assembly 50 includes a superconductor 52 connected to the drogue 30 by one or more tethers 42, 44. The tethers 42, 44 are made from a flexible, inextensible material and are sufficiently taught so as to keep the superconductor 52 aligned with the receiving space 32. In one example, the superconductor 52 is a high temperature, type-II superconductor, such as yttrium barium copper oxide.

A cooling medium 54 (or heat insulating medium) can be provided around and over the superconductor 52. The cooling medium 54 can be, for example, liquid nitrogen or solid methane. The cooling medium 54 acts to lower and hold the temperature of the superconductor 52 below a critical temperature $T_c$, e.g., about 93° K. A pouch or cover 56 encloses the cooling medium 54 around the superconductor 52. The cover 56 can be formed from a thermally insulating material such as, for example, aerogel. Depending on the type of cooling medium 54 used, the cover 56 can be omitted.

When the superconductor 52 is above the critical temperature $T_c$, magnetic field lines from nearby magnets pass through the superconductor undisturbed. However, once the superconductor 52 reaches a temperature at/below the critical temperature $T_c$, eddy currents are produced in the superconductor 52 that substantially cancel the external magnetic field lines, thereby expelling those external magnetic field lines from the superconductor and repelling or levitating the magnet away from the superconductor. This phenomenon is known as the Meissner Effect.

At the same time, for type-II superconductors, a portion of the external magnetic field lines penetrate the superconductor and become trapped or pinned therein. These pinned magnetic field lines magnetically couple the superconductor to the magnet and thereby provide some attractive stabilizing force between the two. This is known as Flux Trapping Effect. That said, the Flux Trapping Effect provides some stabilizing attractive forces between the repelled/levitating magnet and superconductor caused by the Meissner Effect.

Extending from the aircraft 10 is a refueling probe 70 for releasably connecting to the drogue 30 in a manner to be discussed. It will be appreciated that the drogue 30 and refueling probe 70 could be switched such that the drogue is secured to the aircraft 10 and the refueling probe is secured to the tether 22 extending from the tanker 12 (not shown). In such a construction, the operator on board the tanker 12 flies the refueling probe 70 into the drogue 30 on the aircraft 10 to refuel the aircraft. This configuration is known by those skilled in the art as a flying boom-type refueling system.

Figure 3:
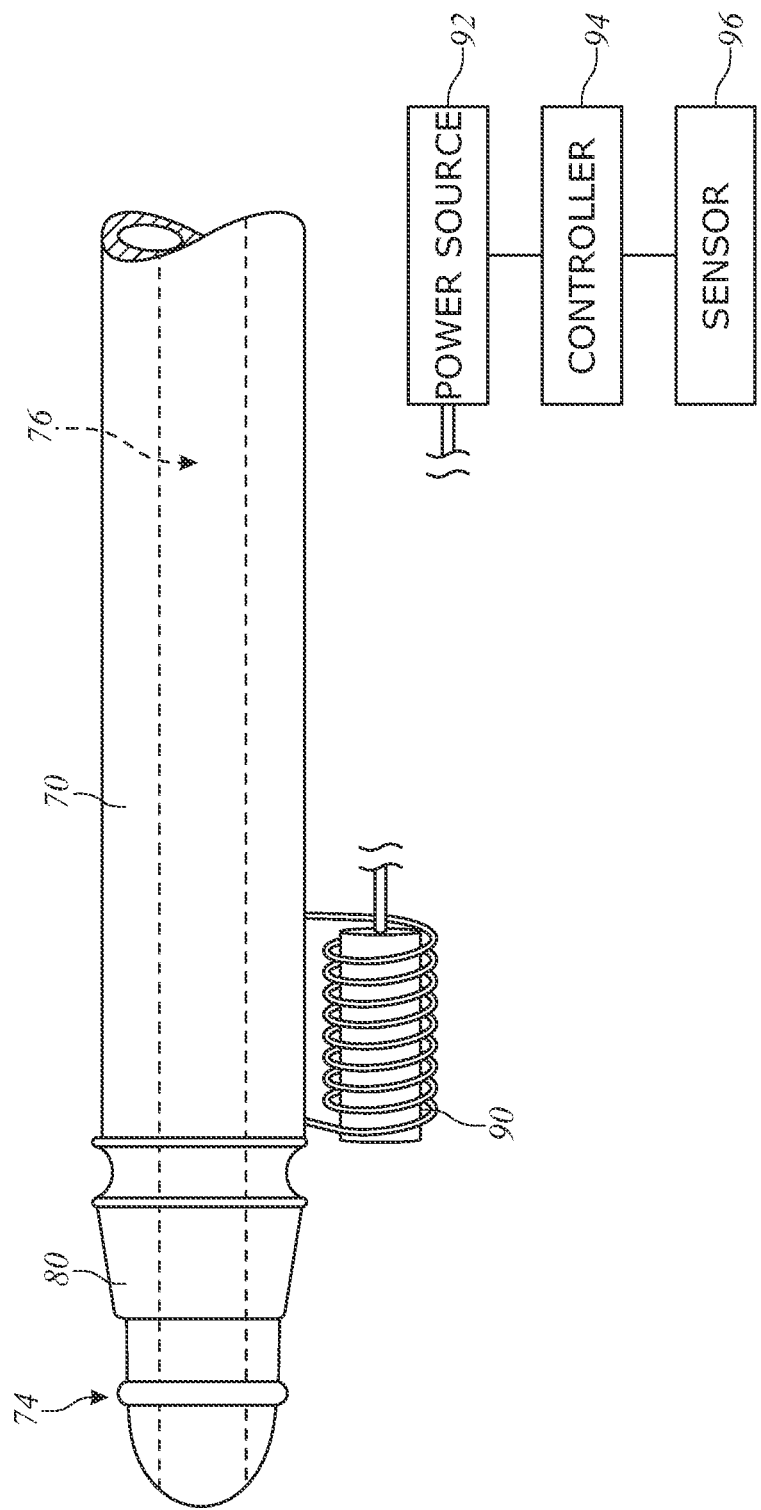
FIG. 3 is an enlarged view of a refueling probe of FIG. 1.

Referring to FIGS. 1 and 3, the refueling probe 70 extends longitudinally from a first end 72 connected to the aircraft 10 to a second end 74 spaced therefrom. A passage 76 extends the entire length of the refueling probe 70 and is in fluid communication with a fuel tank (not shown) of the aircraft 10. A nozzle 80 is provided on the second end 74 of the refueling probe 70 and is configured to mate with the drogue 30 to fluidly connect the aircraft 10 to the tanker 12. More specifically, the nozzle 80 is configured to releasably connect to the drogue 30 in a manner that allows the nozzle to transfer fuel from the tanker 12 to the aircraft 10.

In one example, the nozzle 80 and drogue 30 couple together by forming a releasable connection, e.g., snap-fit, in conformity with the aforementioned Military Standard. The connection can withstand up to, for example, about 400 lbs of force before the refueling probe 70 detaches from the drogue 30. This is also the amount of force required to open a fueling valve (not shown) internal to the system to allow fuel to be delivered from the tanker 12 to the nozzle 80.

An electromagnet 90 is connected to the refueling probe 70 at or near the nozzle 80. In one example, the electromagnet 90 is positioned slightly downstream of the nozzle 80 and held in close proximity with the centerline of the refueling probe 70. The electromagnet 90 is electrically connected to a power source 92 onboard the aircraft 10. A controller 94 controls the selective application of power by the power source 92 to the electromagnet 90. More specifically, energizing the electromagnet 90 generates a magnetic field in/around the nozzle 80. Conversely, no magnetic field is generated in/around the nozzle 80 when the electromagnet 90 is not energized.

A sensor 96, e.g., a proximity sensor, is connected to the controller 94 and provides signals to the controller indicative of the distance between the refueling probe 70 and refueling device 20, e.g., between the second end 74 and the drogue 30.

The coupling assembly 50 and electromagnet 90 advantageously cooperate to facilitate fluid connection and binding between the refueling probe 70 and the drogue 30. In particular, the electromagnet 90 and superconductor 52 rely on both the Meissner Effect and Flux Trapping Effect of superconductivity in order to help align the nozzle 80 on the refueling probe 70 with the receiving space 32 of the drogue 30. This, in turn, facilitates establishing fluid communication and fuel transfer from the aircraft 12 to the aircraft 10.

Figure 4:
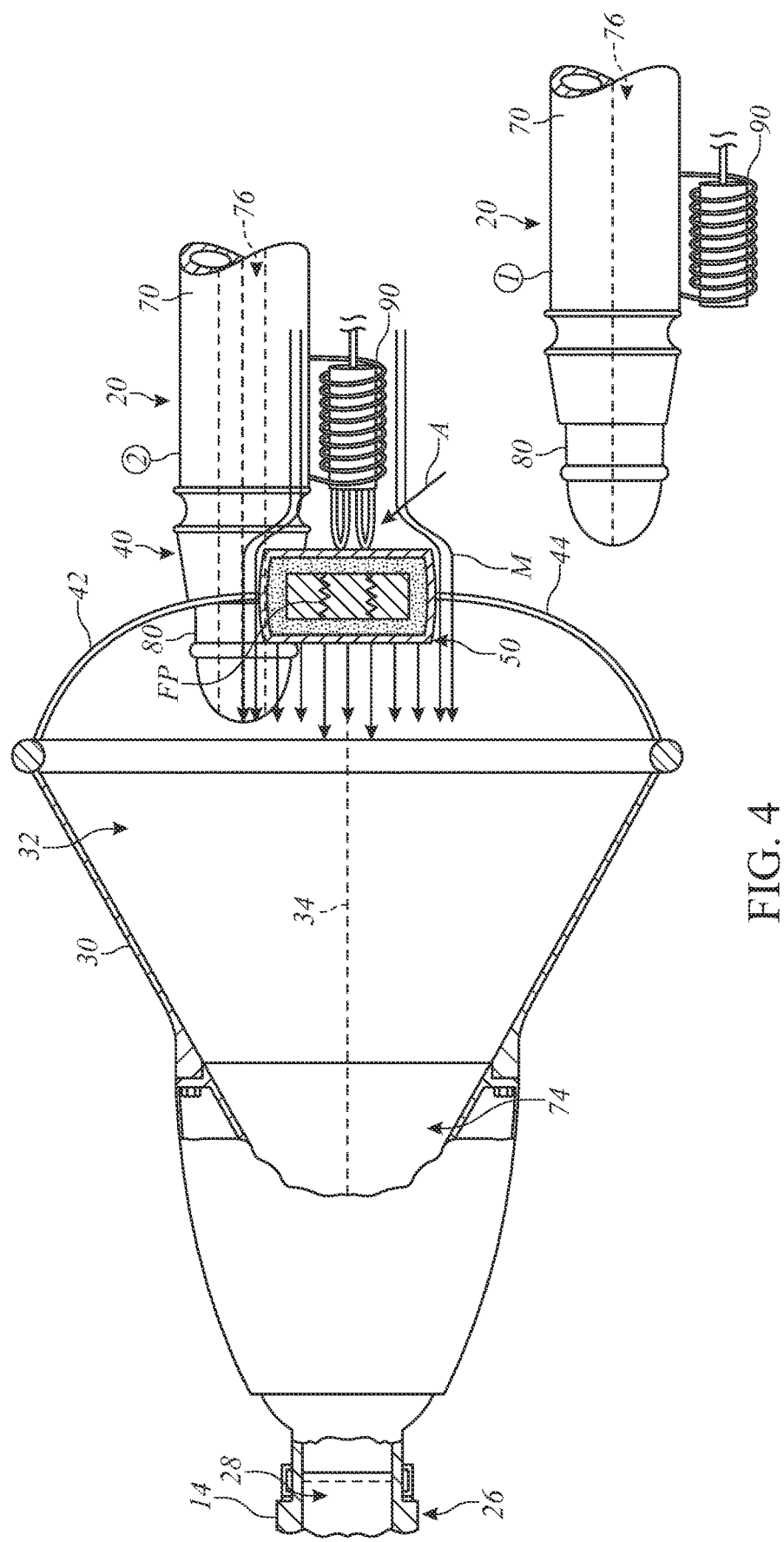
FIG. 4 is a schematic illustration of the refueling probe moving towards a drogue on the tanker aircraft.

In operation, the refueling aircraft 12 is positioned ahead/upstream of the aircraft 10 such that the drogue 30 is aimed generally at the nozzle 80 (see FIG. 4). The aircraft 10 then moves towards the aircraft 12 to move the nozzle 80 towards the receiving space 32. While this occurs, the controller 94 relies on the sensor 96 to track the distance between the nozzle 80 and drogue 30. When the nozzle 80 moves to within a predetermined distance from the drogue 30, the controller 94 directs power to the electromagnet 90 from the power source 92, thereby energizing the electromagnet and creating a magnetic field M around it.

When the magnet field M interacts with the superconductor, both the Meissner and Flux Trapping Effects occur, whereby the magnetic field M is substantially expelled by the superconductor. At the same time, a portion of the magnetic flux FP becomes trapped within the superconductor 52, causing attraction between the electromagnet 90 and the superconductor 52. As a result, the nozzle 80 moves towards the superconductor 52 and the centerline 34 of the receiving space 32 in the manner A. In other words, the nozzle 80 becomes aligned with the receiving space 32 and enables the pilot of the aircraft 10 to readily advance the nozzle 80 into the receiving space and towards the passage 28. Movement of the nozzle 80 towards the centerline 34 is evidenced by the first position ① and the second position ② in FIG. 4.

At the same time, the Meissner Effect prevents the superconductor 52 and electromagnet 90 from fully magnetically coupling together if/when the two move within a predefined distance from one another. In other words, the Flux Trapping Effect allows the electromagnet 90 and, thus, the nozzle 80 to be attracted to the superconductor 52 from relatively further distances but the Meissner Effect prevents the electromagnet and superconductor from actually magnetically locking together.

Figure 5:
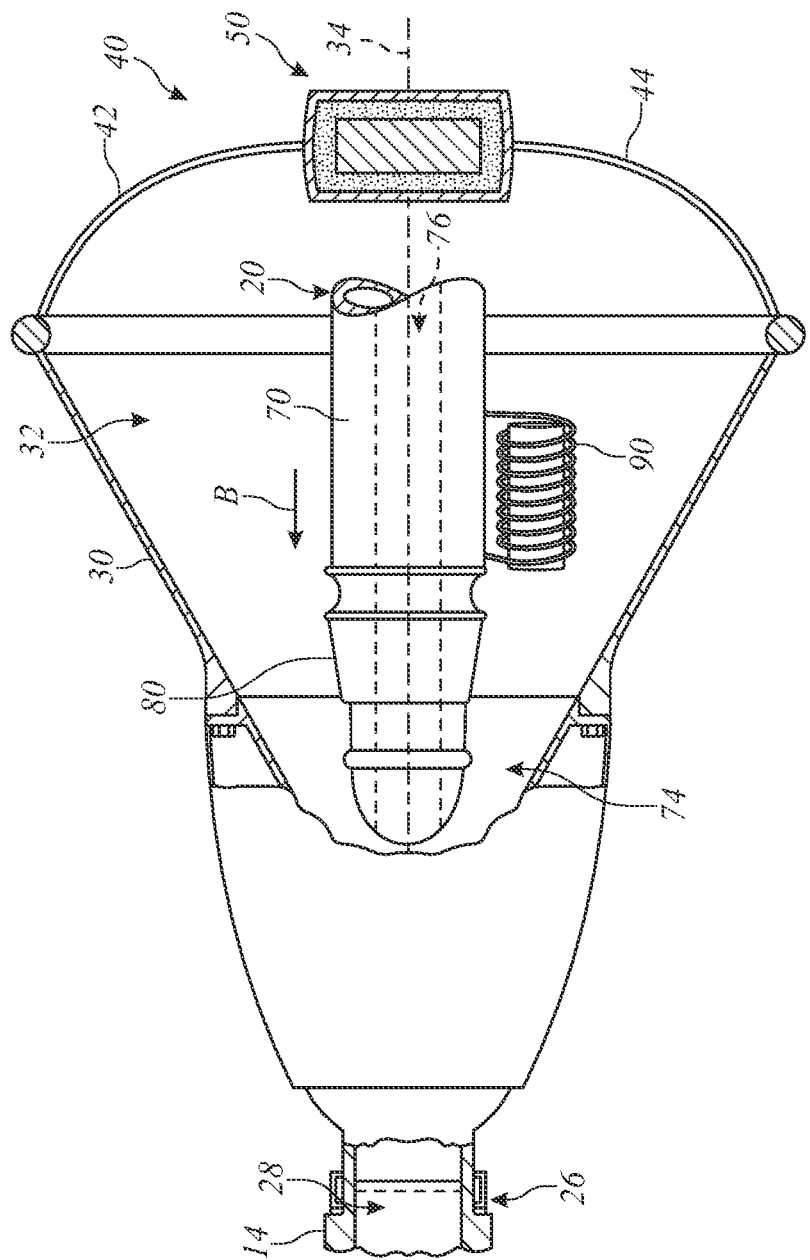
FIG. 5 is a schematic illustration of the refueling probe establishing fluid communication with the drogue.

Once the nozzle 80 moves into the receiving space 32 the power supply to the electromagnet 90 is ceased, thereby placing the electromagnet in a non-energized condition (FIG. 5). This allows the pilot of the aircraft 10 to advance the refueling probe 70 in the manner B and form the interlocking, e.g., snap-fit, connection between the nozzle 80 and drogue 32. Consequently, fluid communication is established between the passages 28, 76 to thereby provide fluid communication between the aircraft 10, 12. This, in turn, enables fuel transfer between the aircraft 10, 12 to occur.

After fueling is accomplished, the aircraft 10 separates from the refueling assembly 14 of the tanker 12. The nozzle 80 is designed to automatically separate or decouple from the drogue 30 when the tanker 12 moves away from the aircraft, i.e., when a sufficient detaching force is achieved.

Figure 6:
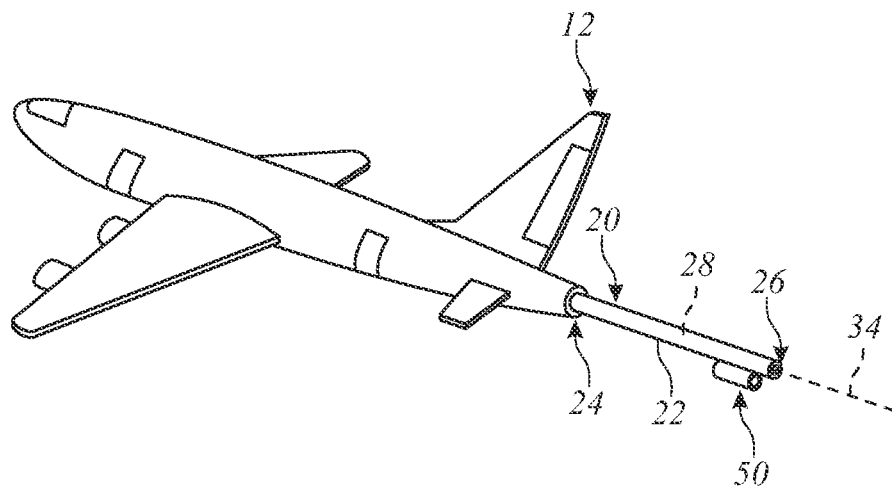
FIG. 6 is a schematic illustration of another example refueling probe receptacle on the tank aircraft.
Figure 7:
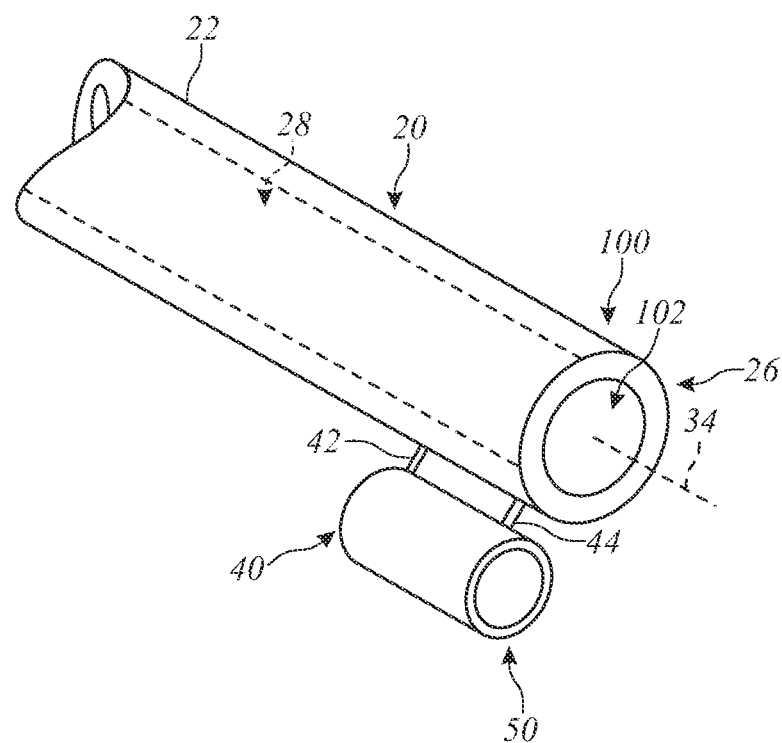
FIG. 7 is an enlarged view of a portion of FIG. 6.

In other example shown in FIGS. 6-7, the refueling probe receptacle is a cylindrical or tube-shaped boom 100. The coupling assembly 50 is positioned at the second end 26 of the tether 22 adjacent the receiving space 102 of the boom 100. The electromagnet 90 is coupled to the aircraft 10 (not shown) and operates with the coupling device 50 in the same manner as described above to enable the probe 80 to establish fluid communication with the passage 28 to fluidly connect the aircraft 10, 12. It will be appreciated that the coupling assembly 50 and electromagnet 90 could be switched such that the electromagnet is positioned on the boom 100 and the coupling assembly positioned on the probe 80 (not shown). Docking of the components 80, 100 and refueling of the aircraft 10 by the tanker 12 occur in the same manner regardless of which refueling component is provided on which aircraft.

The refueling assembly of the present invention advantageously helps pilots perform mid-air refueling operations with drogue and/or boom-type receptacles. This can help reduce training costs for mid-air refueling operations and reduce time and fuel consumption costs for said operations. To this end, the cooperating electromagnet and superconductor can automatically align themselves to thereby automatically align the drogue and refueling probe without human intervention and in a timely/efficient manner.

While the invention has been described with reference to a particular embodiment, it should be understood that the embodiment is merely illustrative as there are numerous variations and modifications, which can be made by those skilled in the art. In particular, the invention can be used on any cooperating refueling components where it is desirable to automatically align and couple the same for mid-air refueling operations.

What is claimed is:

1. An in-flight refueling assembly for an aircraft to be refueled by a fuel dispensing aircraft, the assembly comprising:
   a refueling probe extending from the aircraft and including an electromagnet having an energized condition and a non-energized condition;
   a refueling probe receptacle connected to the fuel dispensing aircraft;
   a superconductor connected to the receptacle such that the refueling probe becomes aligned with the receptacle when the electromagnet is placed in the energized condition.

2. The in-flight refueling assembly of claim 1, further comprising a cooling medium provided around the superconductor.

3. The in-flight refueling assembly of claim 2, wherein a cover encloses the cooling medium around the superconductor.

4. The in-flight refueling assembly of claim 3, wherein the cover comprises an aerogel pouch.

5. The in-flight refueling assembly of claim 2, wherein the cooling medium comprises liquid nitrogen.

6. The in-flight refueling assembly of claim 2, wherein the cooling medium comprises solid methane.

7. The in-flight refueling assembly of claim 1, further comprising at least one tether secured to the receptacle and the superconductor for aligning the superconductor with a receiving space of the receptacle.

8. The in-flight refueling assembly of claim 1, further comprising:
   liquid nitrogen surrounding the superconductor; and
   an aerogel cover enclosing the liquid nitrogen.

9. The in-flight refueling assembly of claim 1, wherein the superconductor comprises yttrium barium copper oxide.

10. The in-flight refueling assembly of claim 1, wherein the electromagnet is placed in the non-energized condition to allow the refueling probe to fluidly connect to the receptacle.

11. The in-flight refueling assembly of claim 1, wherein the receptacle includes a receiving space extending along a centerline and placing the electromagnet in the energized condition moves the refueling probe towards the centerline.

12. The in-flight refueling assembly of claim 1, wherein the receptacle is a drogue.

13. The in-flight refueling assembly of claim 1, wherein the receptacle is cylindrical.

14. A method of fluidly connecting an aircraft with a fuel dispensing aircraft, comprising:
   providing an electromagnet on a refueling probe of the aircraft;
   providing a superconductor on a refueling probe receptacle of the fuel dispensing aircraft;
   placing the electromagnet in an energized condition to automatically align the electromagnet with the superconductor; and
   fluidly connecting the probe to the receptacle.

15. The method of claim 14, further comprising providing a cooling medium around the superconductor.

16. The method of claim 14, wherein the cooling medium comprises liquid nitrogen.

17. The method of claim 14, wherein the cooling medium comprises solid methane.

18. The method of claim 14, further comprising:
   liquid nitrogen surrounding the superconductor; and
   an aerogel cover enclosing the liquid nitrogen.

19. The method of claim 14, wherein the superconductor comprises yttrium barium copper oxide.

20. The method of claim 14, further comprising placing the electromagnet in a non-energized condition after alignment between the probe and the receptacle to allow the refueling probe to fluidly connect to the receptacle.

* * * * *